Sept. 16, 1947.  H. SHIROYAN  2,427,627
LEAK INDICATOR FOR GAS-FILLED CONDUCTOR CABLE
Filed April 4, 1944
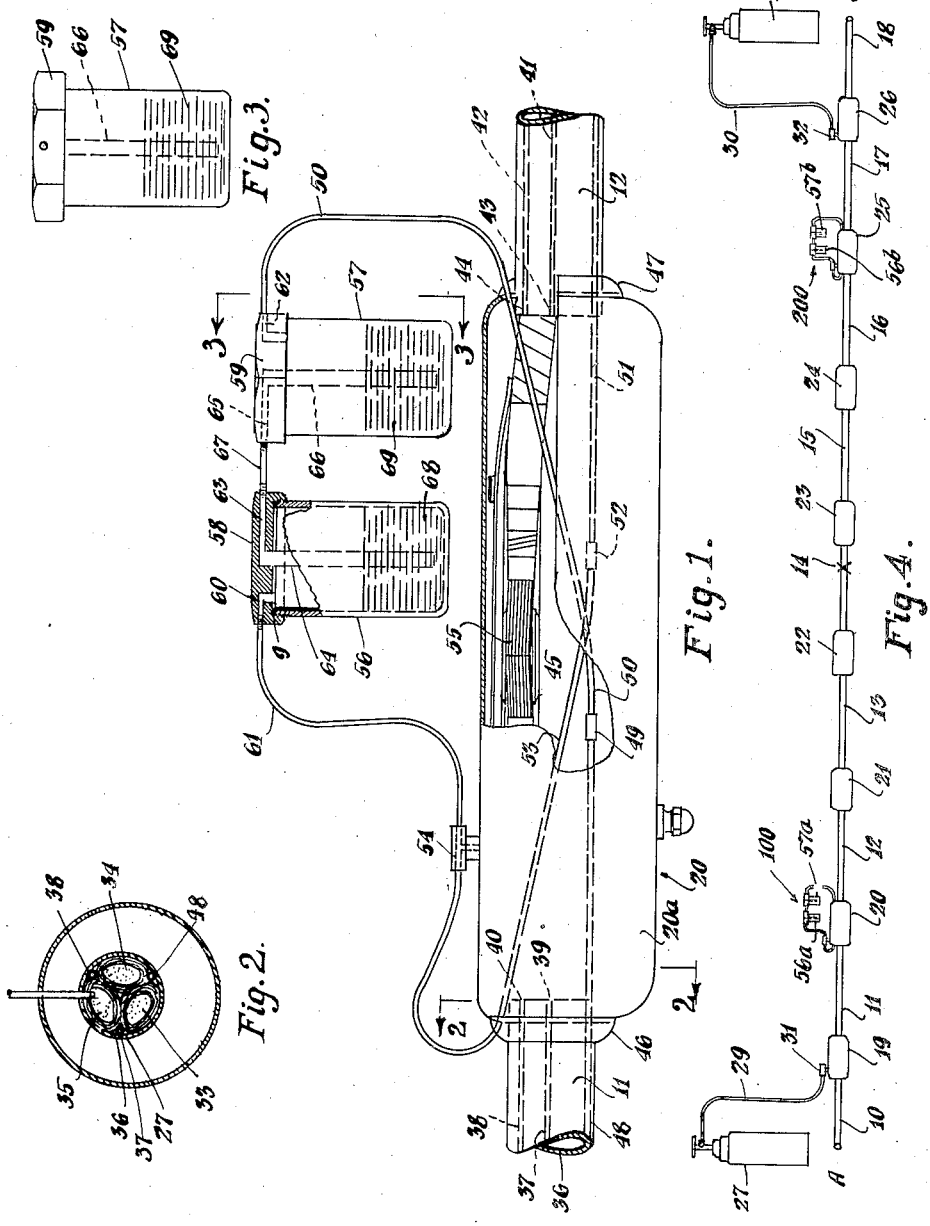
INVENTOR.
Haig Shiroyan Patented Sept. 16, 1947

2,427,627

UNITED STATES PATENT OFFICE 2,427,627

LEAK INDICATOR FOR GAS-FILLED CONDUCTOR CABLE

Haig Shiroyan, Flushing, N. Y.

Application April 4, 1944, Serial No. 529,555

6 Claims. (Cl. 174—11)

1

This invention relates to devices for indicating pressure leaks in gas-filled conductor cables.

In that type of conductor cable for the transmission of high voltage electric current known in the art as gas-filled cable it is important to keep the system free of gas leaks in order to maintain proper pressures throughout the feeder length and to avoid frequent replacement of gas supply tanks which is necessary when gas leaks exist. For more detailed discussions of this type of cable see article entitled Low-Gas-Pressure Cable 58 A. I. E. E. Transactions 307-318 and Low-, Medium-, and High-Pressure Gas-Filled Cable 61 A. I. E. E. Transactions 719-725.

In general, this type of cable comprises three multi-strand copper wire conductors, each of said conductors being covered with impregnated paper insulation. The three conductors are held together in substantially parallel relationship by metal binding bands and the three conductors are then covered with a spirally wrapped paper insulator and the so bound copper conductors are then encased in a lead sheath. Running through each length of cable and parallel with the copper conductors are at least two lengths of copper tubing, one having a perforated or "open" wall, the other a solid wall. The lengths or sections of cable are joined by a wiped joint. The solid wall tubing is connected at the joint in such manner that gas (usually, an inert gas such as nitrogen) is maintained under pressure within the cable.

Manifestly, if gas leaks develop in the cable the pressure is depleted and more gas from the supply tanks is used up with resulting increased costs of maintenance. Accordingly it is important to detect leaks so they may be repaired.

Of course the larger leaks have been relatively easy to find by maintaining equal pressures from gas supplies at both ends of the feeder and by measuring pressure by the use of pressure gages at intermediate points along the feeder. The leak is located near the lowest pressure point. However, in the case of small leaks in porous wiped joints or "wipes" and fittings along the feeder, it has been necessary to resort to the use of soap solution on all the wipes and fittings until the leak is found. This method is both expensive and cumbersome since it is necessary to remove arcproofing from the cable and joints at each location where the soap solution is used. This method is of practically no use in locating small leaks in cable that is in the duct.

It is an object of my invention to provide a means and method for indicating and locating

2 leaks in gas-filled cable which are not subject to the disadvantages and shortcomings of prior practices.

Although the novel features which are believed to be characteristic of the invention will be pointed out in the claims appended hereto, the invention itself as to its objects and advantages and the manner in which it may be carried out may be better understood by reference to the description which follows taken together with the accompanying drawings forming a part hereof, in which Fig. 1 is a side view in elevation and partly in section of the novel apparatus embodying my invention, showing the manner of its connection to the gas-filled cable at a wiped joint, the illustration being more or less diagrammatic;

Fig. 2 is a view in cross section of the wiped joint and cable on line 2—2 of Fig. 1;

Fig. 3 is a view in elevation on line 3—3 of Fig. 1 and

Fig. 4 is a view in elevation to much smaller scale to illustrate a typical feeder cable showing a number of sections joined together with wiped joints and equipped with indicators embodying my invention.

Referring now to the drawings a typical section of feeder on a feeder system is illustrated in Fig. 4. It comprises a plurality of cable sections 10 to 18 inclusive. The ends of the cable sections are connected by joints 19 to 26 inclusive. The end joints 19 and 26 are connected to nitrogen tanks 27 and 28 respectively by means of tubes 29 and 30. Tube 29 is connected to a joint nipple 31 which provides communication through the sleeve of the joint into the interior of the joint 19. Tube 30 is connected to joint nipple 32 in like manner.

Running through each cable section is a solid wall tube and one or more perforated wall tubes. The perforated wall tubes terminate at the ends of the cable sections and communicate with the interior of the joints. On the other hand the solid wall tube extends beyond the cable sections and through the joint walls. The solid wall tubing of one section is joined to the solid wall tubing of its adjacent section. However, the solid wall conduit communicates with the interior of the joint through a T nipple.

Referring now more particularly to Fig. 1 wherein is illustrated a typical joint equipped with an indicator embodying my invention, 11 indicates to larger scale the corresponding cable section shown by the same reference character in Fig. 4 and 12 indicates the corresponding cable section in Fig. 4. The cable sections comprise three multi-strand copper conductor wires 33, 34, 35, insulated and covered, as is well known in the art. These conductor wires are then covered by a lead sheath 36 (see Fig. 2). The perforated wall tubes 37 and 38 terminate at the end of the cable section as indicated at 39 and 40. Corresponding perforated wall tubes 41 and 42 of cable section 12 terminate at the end of this section as indicated at 43 and 44. Hence, the perforated wall tubes communicate with the chamber 45 provided by the joint 20. Joint 20 is what is known as a wiped joint and it comprises sleeve 20a whose ends are sealed to the ends of the cable sections with wiping solder as indicated at 46 and 47.

The solid wall tube 48 is connected by a coupler 49 within the chamber 45 to a further section of solid wall tubing 50 which extends through the wall of the wiped joint. The solid wall tube 51 of cable section 12 is connected by a coupler 52 to a section of solid wall tubing 53 which extends through the wall of the wiped joint 20.

Solid wall tube 53 is connected to a T nipple 54 which provides a conduit into the joint chamber 45. The copper conductors are connected in the chamber 45 in usual known manner, a typical connection being indicated at 55.

To indicate gas leaks there is provided two jars or containers 56 and 57 preferably made of transparent glass. The containers may be threaded at their upper ends to accommodate threaded covers 58 and 59. If desired, gaskets 9 may be provided between the covers and the glass containers to insure an airtight connection. The covers are preferably constructed of metal.

Cover 58 is provided with a conduit 60 providing passageway from the outside to the interior of container 56. It is threaded and is connected to a section of copper tubing 61 which is also connected to T nipple 54. Cover 59 is provided with a similar conduit 62 providing passageway into the container 57, and is connected to the copper tubing section 50.

Cover 58 is also provided with a conduit 63 providing passageway into container 56. A nipple 64 is connected to this conduit and terminates near the bottom of container 56. Cover 59 is provided with a similar conduit 65 and is connected to a nipple 66 which terminates near the bottom of container 57. The two conduits 63 and 65 are threaded and are connected by a nipple 67. This connection may conveniently be made with a nipple having a right hand thread at one end and a left hand thread on the other. Hence, there is provided a continuous conduit between the two containers, herein called, for convenience, an oil conduit. Each container is provided with a quantity of light inert liquid such as light lubricating oil indicated by reference characters 68 and 69. Thus, as shown clearly in Fig. 1 the oil conduit connects the interiors of the two liquid containers 56 and 57, the conduit terminating near the bottoms of the containers, or at least below the surface of the liquid when the latter is in normal position. It will be understood, of course, care should be taken to make all connections air-tight inasmuch as the system in normal operation is under pressure exerted by the gas in the gas-filled cable system.

According to one manner of utilizing my invention, indicators as described hereinabove are installed at joint locations and are inserted between the end of one of the solid wall tubes protruding from the cable joint wipe and the nipple on the joint sleeve, thus placing the indicators in series with the solid tube run, as illustrated in Fig. 1.

Under normal conditions when there is no gas leak in the feeder system the oil in the two glass containers will stand still, but when a gas leak of any magnitude develops anywhere on the feeder, gas will flow from the gas supply tank into the indicator and force the oil into the glass container nearest the leak. The direction of the gas flow will also be indicated by bubbles rising to the surface of the oil in the container nearest the leak.

The indicators are installed permanently at several locations on a feeder. When a leak develops on the feeder a service man may immediately determine the section of feeder which is faulty by observing the direction of gas flow in each indicator. The exact location of the leak, to within a length of cable, can be found by using indicators that can be temporarily inserted in the solid wall tube at joints within the section, and by soap solution when the particular length of cable in trouble is located.

To illustrate the operation of locating a leak on a gas-filled cable by means of the invention, it may be assumed that Fig. 4 represents a feeder section A—B. It is supplied with nitrogen under pressure from two tanks 27 and 28, at the same pressure, one at each end of the feeder section. The feeder section is provided with two permanently installed indicators 100 and 200, at joints 20 and 25. Let it be assumed also that a very small leak develops on the cable section 14 between joints 22 and 23 at the point marked "x."

Normally, when there was no leak on the feeder, the oil in containers 56a and 57a, and 56b and 57b stood still. But if a leak should develop at the point marked "x" in cable section 14, the gas supply from tank 27 will flow through the solid wall tubing in the cable into the indicator 100 on joint 20 and will force all of the oil from the right hand container 57a into the left hand container 56a. The gas will then bubble through the oil in 56a indicating that the leaking joint is towards joint 21. That is, container 56a is, for purposes of description, said to be the one nearest the leak.

Meantime, on the other end of the feeder section the gas from supply tank 28 has begun to flow into indicator 200 on joint 25 and will force all the oil from the left hand container 56b into the right hand container 57b, which is nearest the leak. The gas will then bubble through the oil in container 57b giving visual indication that the leak is toward joint 24.

By inserting temporarily a similar indicator in the solid wall tubing on joint 23 half way between permanently installed indicators 100 and 200, it will be observed the gas flow will be towards joint 22. Using the same indicator on joint 22 the leaky joint will be indicated to be towards joint 23. Consequently the leak can be quickly traced to cable section 14. By applying soap solution on cable ends and joints within this limited part of the feeder the exact point of the leak can be readily determined in the duct line between the joints 22 and 23; whereupon it may be repaired in a manner well known in the art.

From the foregoing it will be seen that the invention provides a simple yet effective means and method for indicating and quickly locating leaks in gas-filled cable systems. The indicators are easily installed and inexpensive to construct, yet their use eliminates the costly and tedious methods heretofore practiced in locating leaks in gas-filled cables.

What is claimed is:

1. A device for indicating leaks in gas-filled conductor cables provided with solid wall gas tubing which comprises a pair of containers adapted to contain a liquid, an inverted U shaped conduit for the passage of liquid from one container to the other interconnecting the interiors of said containers, one leg of said U shaped conduit extending downwardly into one of said containers and the other leg of said U shaped conduit extending downwardly into the other of said containers, the ends of said legs terminating beneath the surface of the liquid in said containers when said liquid is in normal position, a gas conduit connected to one of said containers providing passageway into the interior thereof one end of which terminates above the surface of the liquid and the other end of which is adapted to be connected to the solid wall tubing of one section of said cable, and a gas conduit connected to the other of said containers providing passageway into the interior thereof one end of which terminates above the surface of the liquid and the other end of which is adapted to be connected to the solid wall tubing of another section of said cable.

2. A device for indicating leaks in gas-filled conductor cable having a solid wall gas tube within its covering sheath which comprises a pair of enclosed containers each adapted to be partially filled with a liquid, a first tube communicating with the interior of the first of said pair of containers above the liquid in that container and adapted for communication with the interior of the sheath, a second tube communicating with the interior of the second of said pair of containers above the liquid in that container and adapted for communication with said solid wall gas tube and a U shaped conduit communicating with the interiors of both of said containers, one leg of said last mentioned conduit extending down into said first container and terminating below the surface of the liquid in that container when the liquid is in normal position and the other leg of said last mentioned conduit extending down into said second container and terminating below the surface of the liquid in that container when the liquid is in normal position, the part of said U shaped conduit which connects the other ends of said legs being substantially above the surface of said liquid when the liquid is in normal position.

3. A device for indicating leaks in gas-filled conductor cable having a solid wall gas tube within its covering sheath which comprises a pair of enclosed containers each adapted to be partially filled with a liquid, a first tube communicating with the interior of the first of said pair of containers above the liquid in said container and adapted for communication with the interior of the sheath, a second tube communicating with the interior of the second of said pair of containers above the liquid in that container and adapted for communication with said solid wall gas tube and a U shaped conduit communicating with the interiors of both of said containers, one leg of said U shaped conduit extending down into said first container below the surface of liquid in that container when said liquid is at its normal level and the other leg of said U shaped conduit extending down into said second container below the surface of liquid in that container when said liquid is at its normal level, said U-shaped conduit being adapted to convey liquid from one of said containers to the other of said containers when gas moves through said solid wall tubes and having that part which connects said legs positioned above the surface of the liquid in said containers.

4. In a gas-filled conductor cable feeder system a first section of sheathed cable, a second section of sheathed cable, a sleeve connecting said first and second cable sections, means in the wall of said sleeve providing passageway into the interior of said sleeve, a solid wall gas-conveying tube in said first section of cable extending through the wall of said sleeve and communicating with said passageway, a pair of enclosed containers adapted to be partially filled with a liquid, a solid wall tube communicating with said passageway and the interior of one of said containers and terminating above the surface of liquid in that container, a solid wall gas-conveying tube in said second section of cable extending through the wall of said sleeve and communicating with the interior of the other of said containers and terminating above the surface of liquid in that container, a conduit communicating with the interiors of both of said containers and adapted to convey liquid from one of said containers to the other when gas moves through said solid wall tubes, said conduit being of inverted U shape and having one of its legs extending downwardly into one of said containers and the other of its legs extending downwardly into the other of said containers, the lower ends of said legs terminating below the surface of the liquid in said containers and the upper ends of said legs being connected above the surface of the liquid in said containers when said liquid is at its normal level.

5. In a gas-filled conductor cable feeder system a first section of sheathed cable, a second section of sheathed cable, a wiped joint sleeve connecting said first and second cable sections, a T nipple in the wall of said sleeve providing passageway into the interior of said sleeve, a solid wall gas conveying tube in said first section of cable extending through the wall of said wiped joint sleeve and communicating with said nipple, a pair of enclosed containers adapted to be partially filled with a liquid, a solid wall tube communicating with said nipple and the interior of one of said containers and terminating above the liquid in said container, a solid wall gas conveying tube in said second section of cable extending through the wall of said wiped joint sleeve and communicating with the interior of the other of said containers and terminating above the liquid in said container, an inverted U shaped conduit communicating with the interiors of both of said containers and adapted to convey liquid from one of said containers to the other when gas moves through said solid wall tubes, one leg of said U shaped conduit extending downwardly into one of said containers and terminating below the surface of liquid in that container when said liquid is at normal level and the other leg of said U shaped conduit extending downwardly into the other of said containers and terminating at the same level as said other leg, said legs being connected at their upper ends above the liquid in said containers.

6. In a gas-filled conductor cable feeder system a first section of sheathed cable, a second section of sheathed cable, a wiped joint sleeve connecting said first and second cable sections, means in the wall of said sleeve providing passageway into the interior of said sleeve, a solid wall gas-conveying tube in said first section of cable extending through the wall of said wiped joint sleeve and communicating with said passageway, a pair of enclosed containers adapted to be partially filled with a liquid, a solid wall gas-conveying tube communicating with said passageway and the interior of one of said containers above the liquid in that container, a solid wall gas-conveying tube in said second section of cable extending through the wall of said wiped joint sleeve and communicating with the interior of the other of said containers above the liquid in that container and a liquid-conveying U shaped conduit communicating with the interiors of both of said containers, one leg of said liquid-conveying U shaped conduit extending into the interior of one of said containers and the other leg of said U shaped liquid-conveying conduit extending into the interior of said containers, said legs terminating at their lower ends below the surface of the liquid in said containers when said liquid is at normal level and said legs being connected at their upper ends above said surface.

HAIG SHIROYAN.

REFERENCES CITED

The following references are of record in the file of this patent:

UNITED STATES PATENTS

| Number | Name | Date |
|---|---|---|
| 1,169,795 | Gebhardt | Feb. 1, 1916 |
| 2,071,698 | Mample | Feb. 23, 1937 |
| 2,261,742 | Matsumoto | Nov. 4, 1941 |
| 2,043,227 | Bennett | June 9, 1936 |
| 1,933,312 | Clark | Oct. 31, 1933 |
| 1,732,035 | White | Oct. 15, 1929 |
| 2,051,740 | Palkin | Aug. 18, 1936 |

FOREIGN PATENTS

| Number | Country | Date |
|---|---|---|
| 765,668 | France | Mar. 26, 1934 |
| 625,456 | Germany | Feb. 8, 1936 |
| 830,729 | France | May 23, 1938 |